(12) United States Patent
Van Erp

(10) Patent No.: US 11,793,209 B2
(45) Date of Patent: *Oct. 24, 2023

(54) MALAXATION APPARATUS FOR THE PRODUCTION OF VIRGIN OLIVE OIL

(71) Applicant: GEA FOOD SOLUTIONS BAKEL B.V., Bakel (NL)

(72) Inventor: Joost Van Erp, Nuenen (NL)

(73) Assignee: GEA Mechanical Equipment GMBH, Oelde (DE)

( * ) Notice: Subject to any disclaimer, the term of this patent is extended or adjusted under 35 U.S.C. 154(b) by 872 days.

This patent is subject to a terminal disclaimer.

(21) Appl. No.: 16/610,607

(22) PCT Filed: May 9, 2018

(86) PCT No.: PCT/EP2018/061999
§ 371 (c)(1),
(2) Date: Nov. 4, 2019

(87) PCT Pub. No.: WO2018/206639
PCT Pub. Date: Nov. 15, 2018

(65) Prior Publication Data
US 2020/0068911 A1  Mar. 5, 2020

(30) Foreign Application Priority Data

May 9, 2017 (EP) .................................... 17170103
Mar. 1, 2018 (EP) .................................... 18159559

(51) Int. Cl.
*A23B 7/01* (2006.01)
*A23L 3/005* (2006.01)
(Continued)

(52) U.S. Cl.
CPC ................ *A23B 7/01* (2013.01); *A23L 3/005* (2013.01); *A23V 2002/00* (2013.01); *B01J 19/126* (2013.01); *H05B 6/64* (2013.01)

(58) Field of Classification Search
CPC ... A23L 3/005; A23L 3/01; A23L 3/02; A23L 3/16; A23B 7/01; A23B 9/04; A23B 4/01;
(Continued)

(56) References Cited

U.S. PATENT DOCUMENTS 4,457,220 A   7/1984   Entremont et al.
5,253,567 A   10/1993  Gunawardena
(Continued)

FOREIGN PATENT DOCUMENTS

CN   102986756 A   3/2013
CN   105698228 A   6/2016
(Continued)

OTHER PUBLICATIONS

International Search Report and Written Opinion for International Application PCT/EP2018/061999, dated Jun. 29, 2018.
(Continued)

*Primary Examiner* — Subbalakshmi Prakash
(74) *Attorney, Agent, or Firm* — The Dobrusin Law Firm, P.C.

(57) ABSTRACT

The present invention relates to a heating apparatus, which heats a substance in a chamber. The present invention further relates to a food production line and a method to heat a substance with radio-frequency waves.

22 Claims, 3 Drawing Sheets

(51) Int. Cl.
  *H05B 6/64* (2006.01)
  *B01J 19/12* (2006.01)
(58) Field of Classification Search
  CPC ...... A23B 5/01; B01J 19/126; A23V 2002/00; H05B 6/64
  USPC ........................................................ 219/687
  See application file for complete search history.

(56) References Cited

U.S. PATENT DOCUMENTS

| | | |
|---|---|---|
| 6,246,040 B1 | 6/2001 | Gunn |
| 2006/0006172 A1 | 1/2006 | Sedlmayr |
| 2011/0033584 A1 | 2/2011 | Bilchinsky et al. |
| 2011/0159103 A1 | 6/2011 | Akashe et al. |
| 2012/0103975 A1 | 5/2012 | Okajima |
| 2015/0271877 A1 | 9/2015 | Johansson |
| 2016/0278170 A1 | 9/2016 | Atherton et al. |
| 2016/0324195 A1 | 11/2016 | Simunovic et al. |

FOREIGN PATENT DOCUMENTS

| | | |
|---|---|---|
| EP | 2322883 A1 | 5/2011 |
| FR | 2264494 A1 | 10/1975 |
| GB | 2098040 A | 11/1982 |
| JP | H07255388 A | 10/1995 |
| RO | 125073 B1 | 9/2010 |
| WO | 2009/116923 A1 | 9/2009 |
| WO | 2014/147651 A1 | 9/2014 |
| WO | 2016/100539 A1 | 6/2016 |

OTHER PUBLICATIONS

International Preliminary Report on Patentability for International Application No. PCT/EP2018/061999, dated Aug. 20, 2019.
Yadav Deep et al.—Microwave technology for disinfestation of cereals and pulses, pp. 3568-3576, dated Dec. 16, 2012.
XP002781829—Database WPI Week 201349, DB accession n° 2013-K85640; & CN 102 986 756 A, Mar. 27, 2013.

MALAXATION APPARATUS FOR THE PRODUCTION OF VIRGIN OLIVE OIL

The present invention relates to a heating apparatus, which heats a substance in a chamber. The present invention further relates to a food production line and a method to heat a substance with radio-frequency waves.

Substances, like an olive paste, are normally heated in a vessel with heated sidewalls. However, this is disadvantageous, because fouling builds up on the sidewall and/or the substance is locally overheated, which influences the quality of the resulting product.

It is therefore the objective of the present invention to provide a heating apparatus, a line and a method that do not comprise the deficiencies according to the state in the art.

The problem is attained with heating apparatus, which heats a substance in a chamber, which comprises at least one, preferably a multitude, solid-state radio frequency source(s).

The disclosure made regarding this subject matter of the present invention also applies to the other inventions and vice versa. Subject matters disclosed regarding this invention can also be combined with subject matters from other inventions of the present application.

The present invention relates to a heating apparatus with a solid-state radio frequency (RF)-transistor(s) in a RF power amplifier. A radio frequency power amplifier is an electronic amplifier, that converts a low power radio frequency signal into a higher power signal. Typically, RF-power amplifiers drive the antenna of a transmitter. The antenna can be coupled to and/or located in a waveguide, wherein the antenna can radiate the microwaves into the waveguide which preferably is designed of reflective material and can guide the microwaves to a desired location, for example into the product chamber wherein the products to be treated are located. Compared to a magnetron, an advantages of a solid-state RF energy technology is a low voltage drive, semiconductor reliability and lower energy consumption due to the advanced control system. The inventive apparatus can be used to for example heat, disinfect, pasteurize and/or sterilize a substance. The substance is preferably an edible product for human- and/or animal-consumption, particularly protein containing food product, particularly meat.

Particularly, the substance is an olive paste made from milled olives. The paste may comprise additives like water.

The heating apparatus is therefore preferably a malaxation apparatus, in which a paste made from olives which have been crushed, for example by a mill, is heated to a temperature around 30° C. for a certain period of time, for example 20-30 Minutes. Preferably, the paste is mixed during heating. The process, for example, allows the smaller droplets of oil released by the milling process to aggregate and be more easily separated.

According to a preferred embodiment of the present invention, the inventive apparatus may not only comprise one but a multitude of solid-state radio frequency sources. This can be accomplished by using one or more antennas and/or one or more waveguides. Each radio frequency source can be preferably powered individually and each radio frequency source can be preferably controlled, more preferably closed loop controlled, individual. The wavelength, amplitude and/or the direction of the radiation can be controlled.

The solid-state radio frequency sources are preferably provided in an array of n columns and m rows, wherein n is an integer >1 and m is an integer ≥1. Preferably, the solid-state radio frequencies are arranged, preferably equidistantly, in one row and/or the columns are also arranged preferably equidistantly. In case a multitude of sources, they can be arranged at random. The array is preferably arranged at the circumference of the microwave chamber, for example a vessel and/or a tube.

Preferably, the solid-state radio frequency sources are provided equidistantly around the circumference of product chamber. In this chamber, the edible product to be treated will be placed or it will be transported through this product chamber.

According to a preferred embodiment, the heating apparatus comprises an inlet and an outlet, which are spaced apart from each other. The, preferably edible, substance enters the apparatus, preferably a product chamber through the inlet, passes through the apparatus/product chamber and then exits the apparatus/product chamber through the exit which is different from the inlet. A typical example for such an embodiment is a tube.

Preferably, the inventive heating apparatus comprises means to transport the substance past the solid-state radio frequency source(s). These means can be a tube and a pump, which pumps the substance through the tube. The tube is in the present case the product chamber. Preferably, the tube is at least partially made from a material, that is at least partially transmittable, preferably transparent for the RF-radiation. The tube can for example be made from a plastic material and/or a quartz material, preferably from a food grade plastic material as long as it is at least essentially transparent for microwaves. The pump pumps the substance preferably as a continuous or semi-continuous stream past the RF-source(s). The speed at which the product is pumped is preferably adjustable, so that the residence time in the product chamber can be varied. One or more solid-state radio frequency source(s), preferably an array are arranged at the outer circumference of the tube.

According to another preferred embodiment of the present invention, the substance is provided as a batch, which is placed in the vicinity of the solid-state radio frequency source(s), preferably an array of solid-state radio frequency sources. The batch can be for example a bucket, a trough or the like, with the substance in it. The solid-state radio frequency can for example be moved towards the edible material after it has been placed into the vicinity of the solid-state radio frequency source. At least a part of the solid-state radio frequency source(s) can be fixed to a frame of the inventive apparatus, which can be reciprocated between a remote- and an operating-position. In the remote position, the batch can be place in or near the apparatus and then the solid-state radio frequency source(s) are moved into their operating position.

According to another preferred embodiment of the present invention, chamber comprises a sidewall, a bottom and/or a cover, e.g. the chamber is a vessel. The substance to be heated is preferably filled batch-wise into the chamber. The solid-state radio frequency source(s) is/are provided in the sidewall, in the bottom and/or in the cover. The solid-state radio frequency source(s) can be located above the filling level of the chamber and/or can be submerged into the substance. Preferably, the solid-state radio frequency source(s) are protected by at least partially transparent shielding means, which protect the solid-state radio frequency source(s) for example from influences of the substance and/or a cleaning liquid.

Preferably, the heating apparatus comprises a control system to control the solid-state radio frequency sources. The control system preferably comprises one or more sensors, whose signal(s) is used to control one or more solid-state radio frequency source(s), preferably individually and/or related to each other. In case multiple sensors are used, they are preferably provided spaced apart in the microwave chamber for instance, in an application pumping the substance through a tube, gradually heating of the mass can be achieved by controlling the electromagnetic fields by controlling the power level, frequency and/or phase versus time with such precision that, for example, an even energy distribution in the product chamber or in the product will be achieved. The RF-energy load can be adapted to the progress of the heating process. During heating the RF-energy load can change. This change in load can be detected, for example via the antenna by measuring the reflected energy. The control system will compare the transmitted energy via the antenna with the reflected energy and will consequently adjust the energy to be transmitted by the antenna. At each solid-state RF energy sources, the amplitude, the frequency and/or the phase can be controlled individually and/or in groups. The antenna may function as a sensor, for example to detect the radiation reflected from the substance to be treated.

The sensor can sense one or more properties of the substance, for example its temperature and/or the energy absorbed by the substance. One sensor can measure what kind of radiation is reflected from the substance, for example the wavelength. In case the substance is transported during its treatment with the RF-radiation, there can be multiple sensors along the transportation path. The local reading of the sensors can be used to control the corresponding local solid-state radio frequency source(s) and/or the solid-state radio frequency source(s) upstream and/or downstream from the respective sensor. A preferred sensor is a thermocouple, which measures the temperature of the substance, for example a PT100.

The inventive heating apparatus is preferably part of a food production line, which comprises one or more treatment stations, for example a crushing-, cutting- or grinding-station, a forming station, a batter-station, a marination-station and/or a solid liquid separator. The stations can be combined with conveyors or pipes. Preferably the substance enters the line at its entrance and then passes successively all stations of the respective line until it finally exits the line.

Another preferred or inventive embodiment of the present invention is therefore a food- or fee-production line, particularly a food production line comprising the inventive heating apparatus.

The disclosure made regarding this subject matter of the present invention also applies to the other inventions and vice versa. Subject matters disclosed regarding this invention can also be combined with subject matters from other inventions of the present application.

The heating apparatus is preferably provided downstream from a mill and/or upstream from a separator, particularly a solid/liquid-separator.

Preferably the inventive heating apparatus, particularly the radiation can be at least partially isolated from the ambient by one or more valves. The edible product enters the apparatus, for example by means of a pipe. Then a valve, like a gate, preferably a pneumatic valve is at the entrance is closed, so that no or little radiation can exit from the apparatus to the ambient. After the RF-treatment, the valve/gate at the exit and/or the entrance is reopened again and the treated product can exit the apparatus and preferably subsequently untreated product enters the apparatus. The person skilled in the art understands that during batch processing the entrance- and the exit-valve can be one and the same.

The problem is also solved with a method to heat a substance with radio-frequency waves, wherein the radio-frequency waves are provided with one or more solid-state radio frequency source(s).

The disclosure made regarding this subject matter of the present invention also applies to the other inventions and vice versa. Subject matters disclosed regarding this invention can also be combined with subject matters from other inventions of the present application.

The substance to be treated can be an edible substance, for example meat, fish or dough. Preferably, the substance is an olive paste, made from crushed olives.

Preferably the substance is transported from an inlet of a treatment apparatus to an exit of the same apparatus which are spaced apart. According to another preferred embodiment, the substance is heated batch-wise The substance can be transported continuously and or intermittently. They can be transported as a string or as individual portions.

Preferably one or more sensors are provided which measure one or more properties of the edible product, particularly its temperature during heating and/or the radiation reflected from the product. The product-properties are preferably measured at least twice during its treatment with RF-radiation. The changes of the properties are determined and can be taken into account when controlling the solid-state radio frequency source(s).

Transistor technology generates powerful RF fields. Preferably multiple RF sources will be applied, the sources can be controlled individually and preferably related to each other. For instance, in an application pumping a mass through a tube, gradually heating of the substance can be achieved by controlling the electromagnetic fields by controlling the power level, frequency and phase versus time with such precision that an even energy distribution will be achieved. In general, in case of a change in load in a certain spot of the product, mass, product flow or mass flow, the controller can control the specific parameters parameter in that certain spot in order to correct the adverse effects of the load change. For instance, during heating the load will change constantly, this change in load will be detected via the antenna by measuring the reflected energy. The control system will compare the transmitted energy via the antenna with the reflected energy and will consequently adjust the energy to be transmitted by the antenna. For instance, if no load is present within the product chamber, no energy will be absorbed, the antenna receives the reflected energy and the control unit will stop transmitting new energy to the product chamber. With solid-state RF energy sources, the amplitude, the frequency and the phase can be controlled for each and every antenna. Such an advanced energy management system based on a fast response to the heat demand in certain spots of the product(s) to be heated prevents damaging of internal component and prevents an uncontrolled product treatment with uneven energy distribution. Due to the efficient use of energy resulting in less energy loss an additional advantage of solid-state RF energy sources is an increase in yield of products to be treated The inventions are now explained according to the Figures. The explanations apply for all embodiments of the present invention likewise.

Figure 1B:
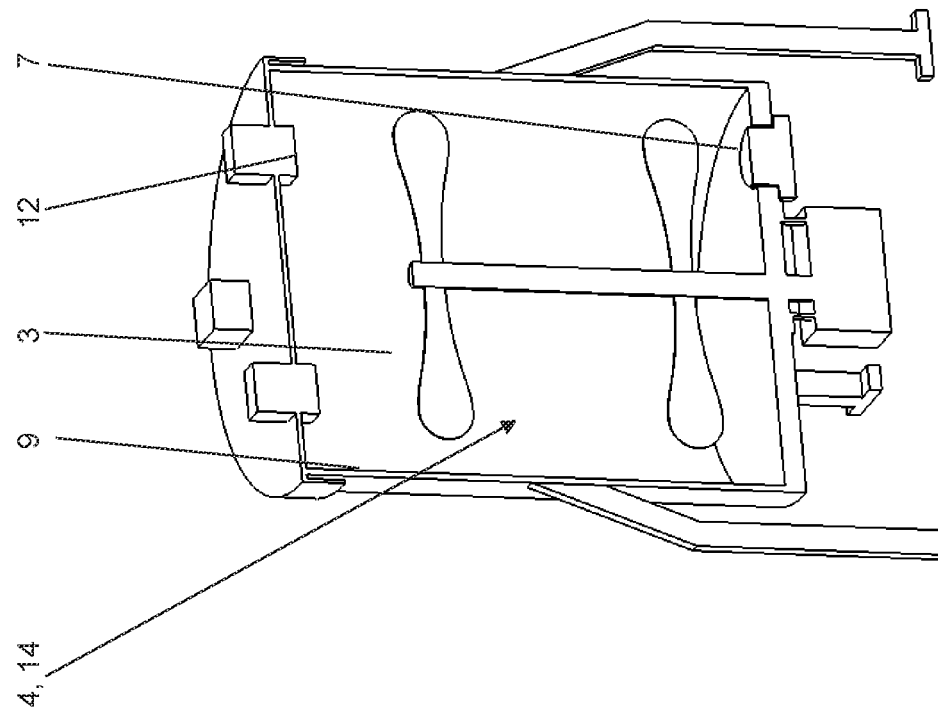
FIGS. 1a and 1b show a first embodiment of the present invention.
Figure 1A:
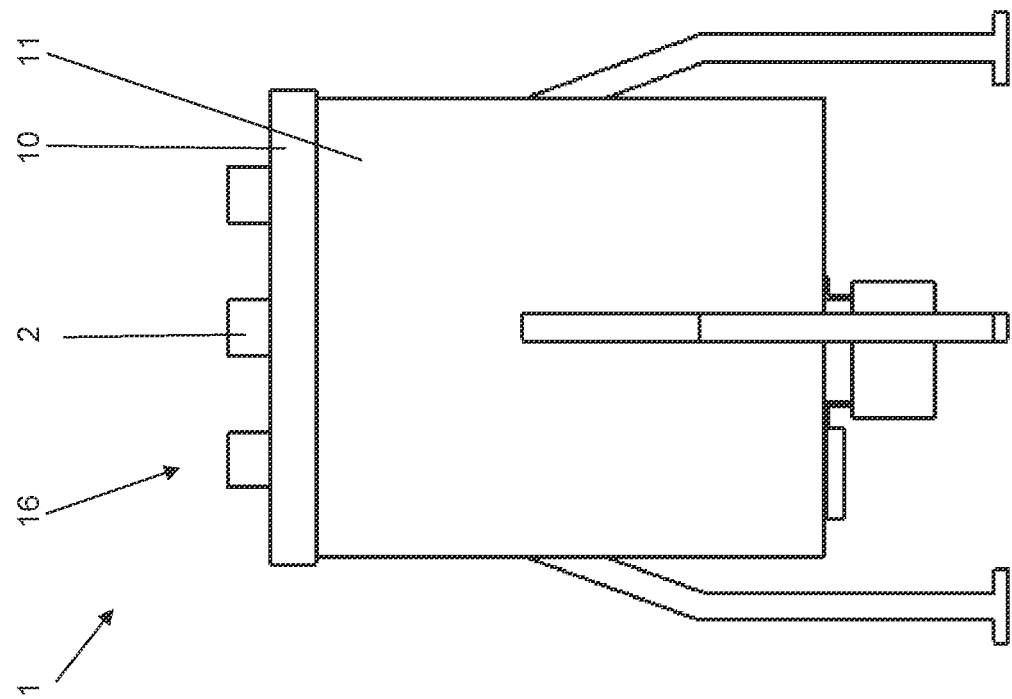
Figure 3B:
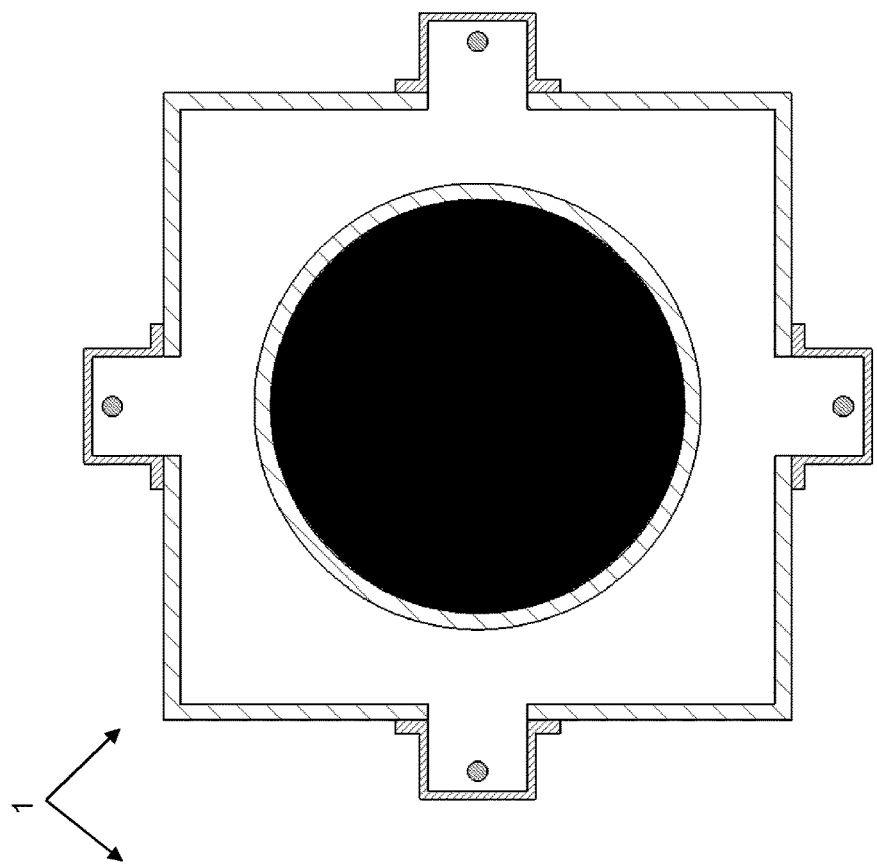
FIGS. 3a and 3b show a third embodiment of the present invention.
Figure 3A:
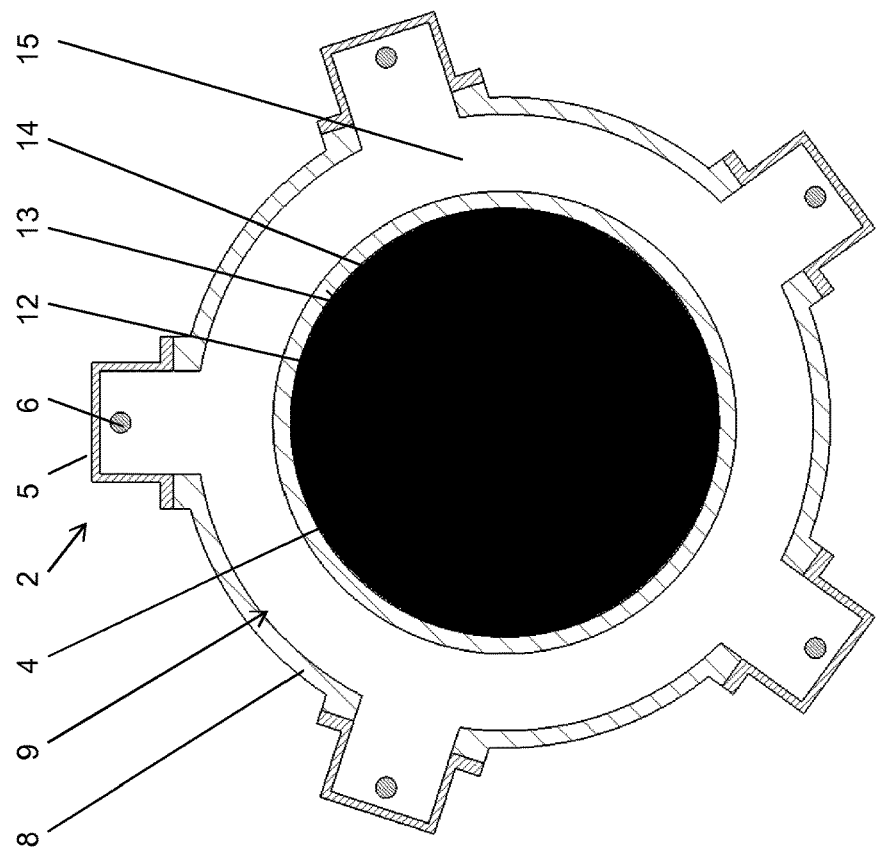

A first embodiment of a solid-state RF energized microwave apparatus is depicted in FIGS. 1a and 1b, which can comprise one, but preferably multiple solid-state RF sources 2 which among other things each comprises a waveguide 5 and/or an antenna 6, as can be seen from FIGS. 3a and 3b. In the present case, the inventive apparatus comprises a multitude of solid-state RF sources 2, which are provided at the circumference of a product chamber 14 and preferably, equidistantly. The number of sources 2 can depend on the efficiency, of the microwaves to heat up product 4 evenly, measured for example the temperature rise per unit of time. In this embodiment, the microwave or product chamber is provided by a vessel 16, with a sidewall 11 and a bottom and a cover 10. The solid-state RF energy source 2 are in the present example provided in the cover 10 of the vessel 16. The vessel comprises a filling and discharge means 7 through which the product to be heated enters and exits the vessel. A mixing means 3 can be provided in the vessel to mix the substance to be heated. The heating apparatus is preferably a malaxation apparatus in which an olive paste is heated. This olive pasted is stirred during heating. The inventive malaxation apparatus can be part of a line comprising a mill upstream from the malaxation apparatus and a separator downstream from the malaxation apparatus. As depicted. The solid-state RF energy source can be shielded by shielding means 12, which are preferably at least partially transparent for microwaves. The shielding means protect the solid-state RF energy sources against the substance to be heated and/or a cleaning fluid.

Figure 2B:
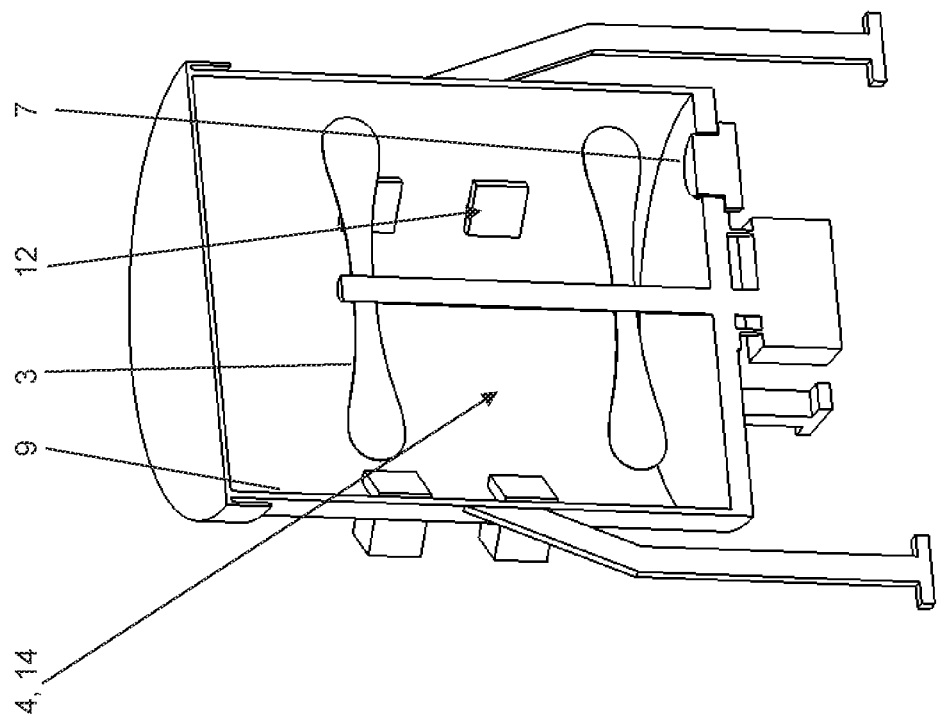
FIGS. 2a and 2b show a second embodiment of the present invention.
Figure 2A:
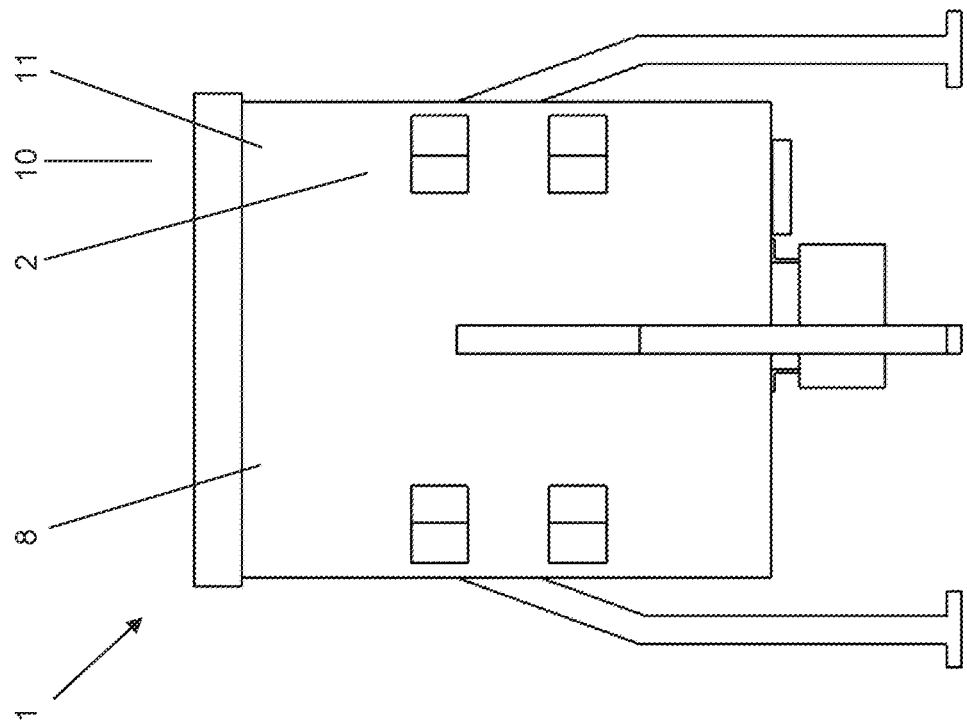

In FIGS. 2a and 2b a second embodiment of the inventive apparatus 1 is shown. Essentially, reference can be made to the disclosure according to FIGS. 1a and 1b. However, in the present case, the solid-state RF energy sources 2 are provided in the sidewall 11 of the vessel 16. Some of the solid-state RF energy source may be below the filling level of the substance and hence submerged.

The person skilled in the art, that according to a not shown example solid-state RF energy source may be in the cover, in the sidewall and/or in the bottom of the vessel.

The above described examples are particularly suitable for a batch-heating of the substance.

FIGS. 3a and 3b show another embodiment of the present invention. The solid-state RF energized microwave apparatus can comprise one, but preferably multiple solid-state RF sources 2 which among other things each comprises a waveguide 5 and/or an antenna 6. A microwave transparent shielding means 12, for example a tube is provided. The means 12 separates the product chamber 14 from the chamber 15, in which the solid-state RF sources 2 are located. The tube material is preferably transparent for microwaves supplied by the solid-state RF sources 2 and more preferably do not absorb microwave energy and will therefore not be heated up by the microwave energy but, if any, only heated up by the warmed-up product. To effectively convert the microwave energy into increased temperature of the substance to be heated, the material of the means 12 is not be metal, but certain plastic materials and/or a quartz-material are suitable. Product 11 is located within the product chamber 14 and will be treated, preferably heated by one preferably multiple solid-state sources 2 located in chamber 15. This embodiment is, for example, preferred in case cleaning agents used to clean product chamber 14 may not be come in contact with the solid-state sources 2. The means 12 can also be used to direct the product past the solid-state RF sources 2. In this case, the product touches the inner circumference of tube at least locally. One, but preferably multiple solid-state RF sources 2 are positioned around the means, here a tube 12 through which a substance 4, for instance olive paste flows. This embodiment can be used to heat the substance batch-wise or continuously. During continuous heating, the paste is pumped through the tube 12 past the sources 2.

LIST OF REFERENCE SIGNS

1 Malaxing apparatus, heating apparatus
2 solid-state RF energy source
3 mixing means, stirrer
4 substance, olive paste
5 waveguide
6 antenna
7 filling, discharge means, discharge point
8 housing, vessel
9 inner wall housing, inner wall vessel 8
10 cover vessel 8
11 sidewall vessel 8
12 microwave transparent shielding means
13 inner wall microwave tube 12
14 product chamber
15 solid-state source chamber
16 Vessel

The invention claimed is:

1. Heating apparatus that is configured to heat a substance, the heating apparatus comprises:
   a product chamber in which the substance is heated,
   a multitude of solid-state radio frequency sources that are provided equidistantly around a circumference of the product chamber,
   a plurality of chambers disposed around the circumference of the product chamber, one or more of the plurality of chambers contain one of the multitude of solid-state radio frequency sources, and
   a microwave tube that is disposed around the circumference of the product chamber, the microwave tube separates the product chamber from the plurality of chambers.

2. Heating apparatus according to claim 1, wherein the heating apparatus is a malaxing apparatus.

3. Heating apparatus according to claim 1, wherein the product chamber comprises a sidewall, a bottom, and/or a cover.

4. Heating apparatus according to claim 3, wherein one or more of the multitude of solid-state radio frequency sources are provided in the sidewall, in the bottom, and/or in the cover.

5. Heating apparatus according to claim 1, wherein the product chamber comprises mixing means.

6. Heating apparatus according to claim 1, wherein the multitude of solid-state radio frequency sources are provided in an array of n columns and m rows, wherein n is an integer >1 and m is an integer ≥1.

7. Heating apparatus according to claim 1, wherein the heating apparatus comprises means to transport the substance through the product chamber and past the multitude of solid-state radio frequency sources.

8. Heating apparatus according to claim 1, wherein the heating apparatus comprises a control system to control one or more of the multitude of solid-state radio frequency sources.

9. Heating apparatus according to claim 1, wherein the heating apparatus comprises a sensor that measures at least one property of the substance and/or at least one property of radiation reflected from the substance, wherein a signal of the sensor is utilized by a control system.

10. Food production line comprising the heating apparatus according to claim 1.

11. Food production line according to claim 10, wherein the heating apparatus is provided downstream from a mill.

12. Food production line according to claim 10, wherein the heating apparatus is provided upstream from a separator.

13. Method comprising:
heating the substance with the heating apparatus according to claim 1; and
transporting the substance from an inlet of the heating apparatus to an exit of the heating apparatus, which are spaced apart,
wherein during the transporting, the substance is transported continuously and/or intermittently, or the substance is heated batch-wise.

14. Method according to claim 13, wherein one or more sensors are provided that are configured to measure one or more properties of the substance and/or radiation reflected from the substance.

15. Method according to claim 14, wherein a signal of the one or more sensors is utilized to control the multitude of solid-state radio frequency sources.

16. Heating apparatus according to claim 1, wherein a material of the microwave tube is transparent for microwaves.

17. Heating apparatus according to claim 1, wherein the substance is in contact with an inner circumference of the microwave tube, at least locally.

18. Heating apparatus according to claim 1, wherein the heating apparatus comprises a housing in which the product chamber is located, the housing comprises a plurality of openings defined around its circumference, each of the plurality of openings lead to a respective one of the plurality of chambers in which one of the multitude of solid-state radio frequency sources are located.

19. Heating apparatus according to claim 1, wherein the heating apparatus comprises a waveguide covering one or more of the plurality of chambers and configured to direct RF-radiation in a direction of the substance.

20. Heating apparatus according to claim 1, wherein the heating apparatus comprises one or more sensors, the multitude of solid-state radio frequency sources are configured to generate and transmit microwave energy to the substance to heat the substance, the one or more sensors are configured to measure the microwave energy that is reflected from the substance, and a control system is configured to compare the transmitted microwave energy to the reflected microwave energy and then, based on the comparison, the control system is configured to adjust any additional microwave energy that is transmitted by one or more of the multitude of solid-state radio frequency sources to the substance.

21. Heating apparatus that is configured to heat a substance, the heating apparatus comprises:
a product chamber in which the substance is heated,
a multitude of solid-state radio frequency sources that are provided equidistantly around a circumference of the product chamber,
a plurality of chambers disposed around the circumference of the product chamber, one or more of the plurality of chambers contain one of the multitude of solid-state radio frequency sources, and
a housing in which the product chamber is located, the housing comprises a plurality of openings defined around its circumference, each of the plurality of openings lead to a respective one of the plurality of chambers in which one of the multitude of solid-state radio frequency sources are located.

22. Heating apparatus that is configured to heat a substance, the heating apparatus comprises:
a product chamber in which the substance is heated,
a multitude of solid-state radio frequency sources that are provided equidistantly around a circumference of the product chamber,
a plurality of chambers disposed around the circumference of the product chamber, one or more of the plurality of chambers contain one of the multitude of solid-state radio frequency sources, and
a waveguide covering one or more of the plurality of chambers and configured to direct RF-radiation in a direction of the substance.

* * * * *